March 2, 1943.　　　　A. H. MOREY　　　　2,312,924
LOCOMOTIVE DRIVE ARRANGEMENT
Filed March 12, 1942　　　2 Sheets-Sheet 1

Inventor:
Arthur H. Morey,
by Harry E. Dunham
His Attorney.

March 2, 1943.  A. H. MOREY  2,312,924
LOCOMOTIVE DRIVE ARRANGEMENT
Filed March 12, 1942  2 Sheets-Sheet 2
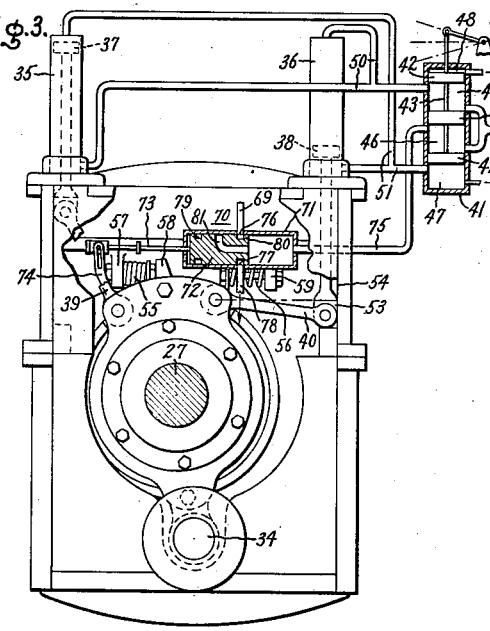
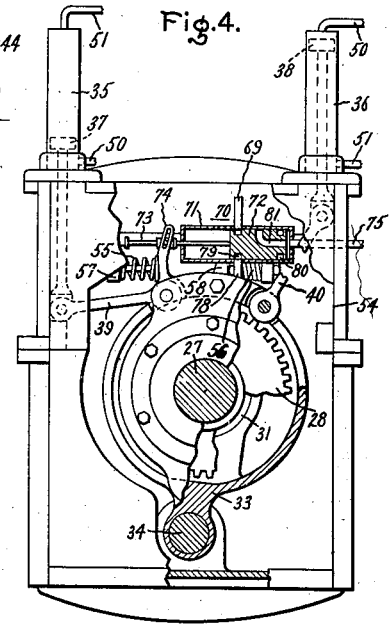
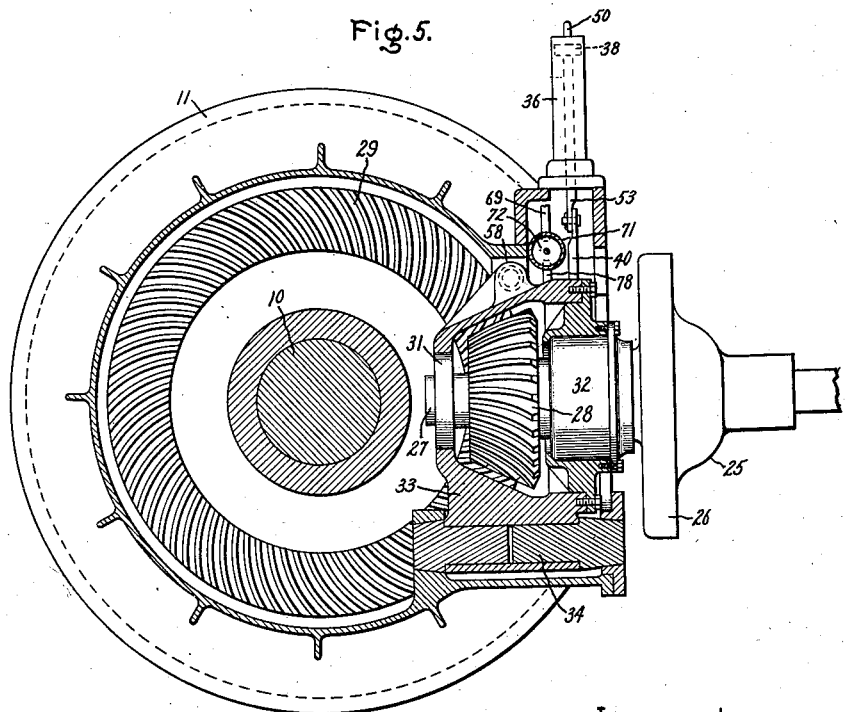
Inventor:
Arthur H. Morey,
by Harry E. Dunham
His Attorney.

Patented Mar. 2, 1943

2,312,924

UNITED STATES PATENT OFFICE 2,312,924

LOCOMOTIVE DRIVE ARRANGEMENT

Arthur H. Morey, Erie, Pa., assignor to General Electric Company, a corporation of New York Application March 12, 1942, Serial No. 434,385

4 Claims. (Cl. 74—355)

The present invention relates to locomotive drive arrangements including a power agency or prime mover such as an elastic fluid turbine and speed reducing and reversing means connecting the power agency to a drive axle.

The object of my invention is to provide an improved construction of locomotive drive arrangements which is simple and rugged in design and can be readily shifted from forward to reverse operation.

For a consideration of what I believe to be novel and my invention, attention is directed to the following description and the claims appended thereto in connection with the accompanying drawings.

Figure 1:
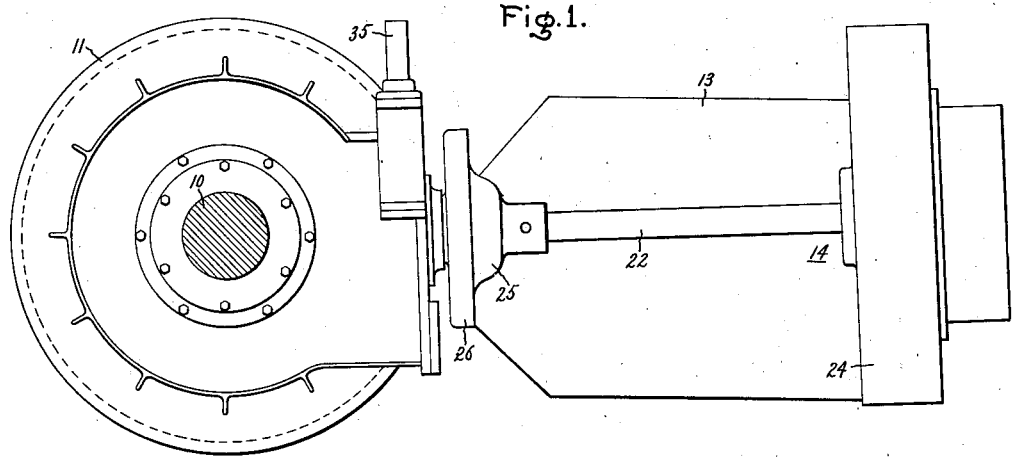
Figure 2:
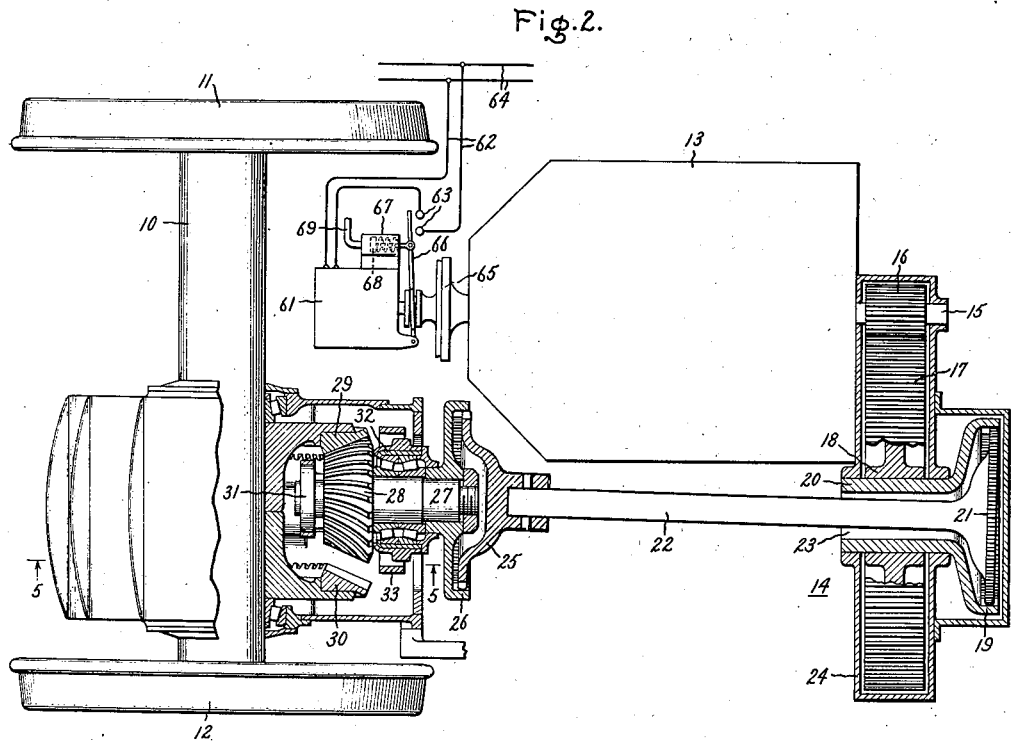

In the drawings Fig. 1 illustrates a side view of an arrangement embodying my invention; Fig. 2 is a top view, partly in section, of the arrangement of Fig. 1; Figs. 3 and 4 show front views of the arrangement in two different operating positions; and Fig. 5 illustrates an enlarged sectional view along line 5—5 of Fig. 2.

The arrangement comprises an axle 10 with wheels 11 and 12 connected to its ends. The axle 10 is driven by a prime mover such as an elastic fluid turbine 13 through the intermediary of a speed reducing and reversing gearing 14. The turbine 13 has a shaft 15 with a pinion 16 meshing with a gear 17. The gear 17 has a hub 18 fastened to the end of a universal coupling comprising an internal gear or coupling member 19 with a hollow hub 20 which is secured to the aforementioned hub 18. In addition the universal coupling includes an external gear or coupling member 21 secured to the end of the shaft 22. The teeth of the gear 21 mesh with the teeth of the internal gear 19 and the shaft 22 passes freely through a bore 23 of the hub 20. The hub 20 of the gear 19 is rotatably supported on a casing 24 which latter and the turbine are suitably secured on the locomotive frame, not shown.

The left-hand end of the shaft 22 is secured to an external gear or coupling member 25 meshing with an internal gear or coupling member 26. The latter has a hub fastened to a shaft 27 which also carries a beveled pinion 28 arranged in cooperative relation with two beveled gears 29 and 30. In the present instance the pinion 28 meshes with the gear 29. In this position torque may be transmitted from the turbine 13 through the pinion 16 to the gear 17, whence the torque is transmitted through the universal coupling including the members 19, 21 and the members 25, 26 to the shaft 27 of the pinion 28. The latter transmits the torque through the gear 29 to the axle 10.

My invention includes the provision of means for moving the pinion 28 out of engagement with one of the gears 29, 30 and into engagement with the other of these gears. To this end the beveled pinion 28 with its shaft 27 and the internal gear 26 secured thereto are pivotally supported. As shown in Figs. 2 and 5 the shaft 27 is rotatably supported in bearings 31 and 32 which in turn are held in a casing 33 having a lower portion pivotally held on a pivot 34. With this arrangement the casing 33 may be turned or swung about the pivot 34 and the pinion 28 may be moved into engagement with either of the gears 29, 30 and thereby the locomotive may be operated in either direction. The coupling shaft 22 extending along the entire length of the turbine is turned or swung a small angle only during reversing operation.

The arrangement includes means to effect such reversing operation by manipulation of a simple lever and to lock the casing 33 in position during operation. This means includes two hydraulic motors, preferably air pressure operated motors 35 and 36, each having a piston 37 and 38, respectively. The piston 37 of the motor 35 has a stem pivotally connected by a toggle 39 to one side of the casing 33. The piston 38 of the servo-motor 36 has a stem pivotally connected by a toggle 40 to the other side of the casing 33. The flow of operating fluid such as air under pressure to the hydraulic motors 35, 36 is controlled by a valve 41 which has three heads 42 connected to a stem 43 which at its upper end is pivoted to a fulcrumed operating lever 44. The valve casing with the valve heads forms four chambers 45, 46, 47 and 48. In the position shown, operating fluid is conducted to the chambers 45 and 46 by a pipe 49 and operating fluid under pressure is discharged from the chamber 45 through a port and conduits 50 to the lower end of the hydraulic motor 35 and to the upper end of the motor 36. Simultaneously the upper end of the motor 35 and the lower end of the motor 36 are connected by pipes 51 to the chamber 47 to discharge fluid through a drain port. Thus in the position indicated in Fig. 3 the piston 37 of the motor 35 assumes its upper end position and the piston 38 of the motor 36 assumes its lower end position. If the hand lever 44 is turned counterclockwise into the dash-dotted line position 52 the position of the hydraulic motor pistons is reversed as indicated in Fig. 4 in which position the pinion shaft with its casing 33 has been moved towards the right.

The toggle 40 with the elements associated therewith is arranged so that in the position indicated in Fig. 3 it is beyond the dead centerline, the dead centerline being the line drawn from the left-hand end of the toggle 40 perpendicular to the stem or centerline of the piston 38. To assure smooth operation the lower end portion 53 of the stem of the piston 38 forms a crosshead engaged by a guide 54.

The toggle mechanisms and the casing 33 are locked in position, that is beyond the center line of the particular toggle mechanism by means of springs 55 and 56. The spring 55 is held on a fixed support 57 in cooperative relation with a projection 58 of the casing 33. Similarly, the spring 56 is held on a fixed support 59 and is also in cooperative relation with the projection 58. In the position in Fig. 3 the spring 55 is compressed by engagement with the projection 58 and thereby the spring 55 biases the housing or casing 33 clockwise and locks the toggle mechanism 40 into its "beyond or over center" position. In the position in Fig. 4 the spring 55 is expanded while the spring 56 is compressed by engagement with the projection 58 and locks the toggle mechanism 39 into its "beyond or over center" position. Once the casing 33 has been moved to effect complete meshing between the pinion 28 and one of the gears 29, 30 the casing 33 is held in position by action of one of the springs 55, 56 which lock the corresponding toggle mechanisms 40 and 39 in position. The hydraulic motors 35 and 36 then may be disconnected from the source of fluid pressure by closing a valve 60 in the supply pipe 49.

Reversing of the operation is only possible when the teeth of the pinion 28 are located so that some of them may enter the spaces between the teeth of one of the cooperating gears 29, 30. Sometimes the pinion is not in the proper angular position to permit meshing with one of the gears 29, 30. The tops or crest of some gear teeth then hit against the tops or crest of some pinion teeth and it becomes necessary slightly to rotate the pinion 28. This is accomplished by the provision of an auxiliary motor. In the present example I have shown an electric motor 61 (Fig. 2) connected by a circuit 62 including contacts 63 to a power line 64. The auxiliary motor 61 is connected to the turbine shaft 15 by a friction coupling 65 which latter may be moved into and out of engagement by means of a fulcrumed lever 66. Closing of the coupling 65 causes slow angular rotation of the turbine and through the gearing slight rotation of the pinion 28, thus turning the latter into a position in which it may be meshed with one of the gears 29, 30.

My invention includes the provision of means for automatically starting the motor 61 (Fig. 2) when the pinion 28 cannot be brought into meshing relationship with one of the gears 29, 30 and for automatically disconnecting the motor 61 once such meshing relationship has been attained. This means comprises a servo-motor 67 (Fig. 2) which has a spring-biased piston 68 connected to the aforementioned lever 66 and a pipe 69 for conducting operating fluid such as air under pressure to the pressure chamber of the motor 67. The supply of air under pressure forces the piston 68 towards the right, thus causing closing of the coupling 65 and simultaneously bridging of the contacts 63 to close the circuit 62 of the motor 61. The supply of air under pressure to the motor 67 is controlled by a control valve 70 (Figs. 3 and 4). The latter has a casing 71 with a piston 72 movably disposed therein and pivotally connected by a stem 73 to an ear or projection 74 rigidly secured to the casing 33. The right-hand end of the cylinder 71 forms a chamber with a port connected by a pipe 75 to a source of pressure, in the present instance (Fig. 3) to the chamber 46 of the valve 41. A port 76 of the cylinder is connected by the aforementioned pipe 69 to the servo-motor 67 and another port 77 circumferentially spaced from the port 76 is connected to a drain pipe 78. The piston has two circumferentially spaced grooves 79 and 80 and a channel 81, the latter communicating in all positions of the piston with the chamber formed at the right-hand end of the cylinder. In the position shown in Fig. 3 the circumferential groove 80 of the piston connects the pipe 69 to the drain pipe 78, thereby effecting draining of fluid under pressure from the servo-motor 67 and causing disconnecting of the auxiliary motor 61 and the clutch 65.

During the reversing operation the casing 33 in Fig. 3 is turned clockwise. Simultaneously with such clockwise turning movement the piston 72 is moved towards the right and in a certain intermediate position the channel 81 in the piston establishes communication between the pipe 75 and the supply pipe 69 for the servo-motor 67. If during this communication the teeth of the pinion can enter the spaces between one of the gears 28, 29 the turning movement of the casing 33 will continue and the piston 72 will travel further to the right. The period of communication between the channel 81 and the pipe 69 then is of such short duration that no pressure is built up in the servo-motor 67 to connect the motor 61 to the line 64 and to effect engagement of the clutch 65. If, however, such meshing relationship cannot be attained at once the casing 33 and accordingly the piston 72 will remain in the intermediate position in which the channel 81 connects the pipe 75 to the pipe 69 and thereby causes the supply and the building up of fluid under pressure in the servo-motor 67. The latter thereupon causes actuation of the motor 61 and slight turning of the turbine 13 and the pinion 28 until the pinion 28 and the gear 29 or 30 mesh and the casing 33 can be further moved clockwise to complete the reversing operation. Upon further clockwise movement of the casing the channel 81 is disconnected from the pipe 69 and in the end position of the piston 72 the groove 79 connects the pipe 69 to the drain port 77 to cause draining of fluid under pressure from the servo-motor 67 whereupon the spring biased piston 68 is forced to the left into the position shown in Fig. 2. The mechanism then assumes the position shown in Fig. 4. The reversing operation from the position shown in Fig. 4 into that of Fig. 3 is similar to that described above. The channel 81 again effects communication between the pipe 75 and the supply pipe 69 in the intermediate position of the piston or valve head 72, and the annular groove 80 in the end position of the piston shown in Fig. 3 again connects the pipe 69 to the drain port 77.

With my arrangement the change from operation in one direction into the reverse direction is completely automatic as regards the proper position of the pinion. All that is necessary for the operator is to turn the hand-lever 44. The supply pipe 75 for the valve 70 is connected to the pressure chamber 46 of the valve 41 in one position of the latter and to the chamber 45 in the reverse position of the latter.

During operation the locomotive should be brought to rest before the reversing mechanism is actuated. In order to preclude faulty operation by the operator it may be desirable to provide an interlocking mechanism which permits admission of air to the cylinders 35 and 36 only after an emergency application of the brakes to the drive wheels has been made. Such mechanism is not shown in the drawings and not further described as it does not form a part of this application.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Locomotive drive arrangement comprising an axle, two beveled gears having teeth facing each other for driving the axle in either direction of rotation, a beveled pinion cooperatively arranged with both gears, a power agency, means including a universal coupling having one element connected to the power agency and another element connected to the pinion, means for supporting the pinion comprising a casing and a pivotal support for the casing, a hydraulic motor having a piston and a toggle mechanism connecting the piston to the casing, said toggle mechanism including a toggle which in an end position is located beyond its dead centerline, and means locking the casing into said position.

2. Locomotive drive arrangement comprising an axle, two beveled gears having teeth facing each other for driving the axle in either direction of rotation, a beveled pinion cooperatively arranged with both gears, a power agency, means including a universal coupling having one element connected to the power agency and another element connected to the pinion, means for supporting the pinion comprising a casing and a pivotal support for the casing, a hydraulic motor having a piston and a toggle mechanism connecting the piston to the casing, said toggle mechanism including a toggle which in an end position is located beyond its dead centerline, and means including a spring and a projection on the casing for locking the toggle into said "beyond dead center" position.

3. Locomotive drive arrangement comprising an axle, two beveled gears having teeth facing each other and secured to the axle, an elastic fluid turbine, a speed reducing gear driven from the turbine, a beveled pinion cooperatively arranged with the beveled gears, universal coupling means connecting the gear to the beveled pinion, means including a casing and a pivotal support for the casing for supporting the pinion, hydraulically actuated means for turning the casing to move the pinion from engagement with one beveled gear into engagement with the other beveled gear, and an auxiliary motor for connection to the turbine shaft to effect slight rotation of the pinion upon the top of a pinion tooth hitting against the top of a beveled gear tooth.

4. Locomotive drive arrangement comprising an axle, two beveled gears having teeth facing each other and secured to the axle, an elastic fluid turbine, a speed reducing gear driven from the turbine, a beveled pinion cooperatively arranged with the beveled gears, universal coupling means connecting the gear to the beveled pinion, means including a casing and a pivotal support for the casing for supporting the pinion, hydraulically actuated means for turning the casing to move the pinion from engagement with one beveled gear into engagement with the other beveled gear, an auxiliary motor, and means for automatically actuating the motor upon the top of a pinion tooth hitting against the top of one of the gear teeth, said last named means comprising a motor actuating lever, a servo-motor connected to the lever and means for conducting operating fluid to the servo-motor including a valve having a piston pivotally connected to said casing.

ARTHUR H. MOREY.